United States Patent [19]
Johnson, Jr.

[11] 3,948,105
[45] Apr. 6, 1976

[54] PROPORTIONING AND MIXING GRADUATE

[76] Inventor: Earl Johnson, Jr., 17264 Arch St., Little Rock, Ark. 72206

[22] Filed: Apr. 1, 1975

[21] Appl. No.: 564,018

[52] U.S. Cl. .................. 73/427; 23/259; 206/219; 206/459; 215/7; 229/17 M
[51] Int. Cl.² ........................................ G01F 19/00
[58] Field of Search ......... 23/259; 73/427; 206/219, 206/459; 222/158; 220/23; 215/6, 7; 229/17 M

[56] References Cited
UNITED STATES PATENTS

| | | | |
|---|---|---|---|
| 1,885,757 | 11/1932 | Orlopp | 206/219 |
| 2,507,684 | 5/1950 | Smith | 215/7 X |
| 2,753,990 | 7/1956 | Chalfin | 215/6 X |
| 2,912,134 | 11/1959 | Kuhlman | 206/219 X |
| 3,094,234 | 6/1963 | Warburg et al. | 206/219 |
| 3,530,722 | 9/1970 | Miller | 215/7 X |
| 3,877,877 | 4/1975 | Prosen | 206/219 X |
| D188,216 | 6/1960 | Dow | 73/427 |

FOREIGN PATENTS OR APPLICATIONS
865,810  7/1949  Germany .............................. 73/427

*Primary Examiner*—Morris O. Wolk
*Assistant Examiner*—Arnold Turk
*Attorney, Agent, or Firm*—Ralph R. Pittman

[57] ABSTRACT

A three-compartment graduate having a main liquid-receiving compartment, a smaller spatially separated liquid-receiving compartment and a normally unfilled mixing compartment coextensively overlying the liquid-receiving compartments is provided with integrally embossed graduate marks and associated indicia along transparent walls of the liquid-receiving compartments visually identifying predetermined volume relationships between the contents within the respective compartments. The graduate enables rapid volume proportioning and mixing of the proportioned liquids within the single container, and is particularly adapted for titrating oil-gasoline mixtures used for the operation of two-cycle internal combustion engines.

8 Claims, 3 Drawing Figures

PROPORTIONING AND MIXING GRADUATE

BACKGROUND

Among the large number of multiple compartment containers described in the prior art, there appears to be none disclosing a single container enabling a user to add liquid separately to two spaced liquid-receiving compartments, ascertain by visual inspection of the respective levels the proportional volume relationship, adjust one of the levels to yield a predetermined volume relationship and blend the liquids by tilting the container to move them along a third superposed mixing compartment to produce the desired composite for a specific application.

An important use for which the liquid-proportioning and mixing graduate herein described is the production of the most desirable gasoline-oil ratio of a lubricating oil and gasoline mixture for burning as a fuel in two-stroke cycle (two-cycle) internal combustion engines. Such engines, because of their relatively greater power output per unit of piston displacement, are widely used for powering manual tools, outboard motor assemblies and similar applications.

Improper fuel-oil mixtures are the principal cause of operating problems with two-cycle engines. If insufficient oil is present in the mixture the moving engine parts will overheat and seize; if excess oil is present, such adverse effects as engine smoking, sparkplug fouling and loss of power quickly result.

SUMMARY OF THE INVENTION

The graduate described herein has two spatially separated vertically extending indicia-bearing liquid-receiving compartments merging with a superjacent horizontally extending mixing compartment, the latter being generally rectangular in section. The shape is suitable for plastic molding, one suitable material of the many available being a relatively clear polyethylene. The graduated level marks and associated numbered indicia are conveniently molded as embossed characters integrally with the body portion.

The graduate has a large main compartment extending downwardly from the mixing compartment, and a relatively much smaller parallel-extending compartment, the upper mixing compartment being superposed coextensively over the main and smaller compartments. The smaller compartment is cantilevered from an upper corner of the main compartment and is attached thereto by a necklike portion merging with the adjacent upper portion of the spaced smaller compartment.

The joining necklike portion is coextensive with the normally unfilled space extending over the compartments, and provides a mixing passageway interposed in the mixing compartment. This construction permits the liquid contents of the graduate to be readily mixed in response to a series of reciprocatory tilting movements of the graduate, the space between the downwardly extending compartments providing a convenient facility for enabling an operator to grasp the graduate about the smaller smaller compartment for manipulation.

A first opening through the top of the graduate is located so that liquid poured therein is directed exclusively into the smaller compartment; a second longitudinally separated opening through the top is positioned to direct fluid exclusively into the main compartment. This disposition of the filling openings assures that the liquids within the graduate are not mixed until the desired volume relationships therebetween are established.

A row of a definite number of liquid level marks and associated numerical indicia extend vertically upward from the bottom and along an upstanding side of the main compartment, and on the same side of the graduate an array of vertical ratio-designated columns of the same definite number of graduation marks is positioned on the smaller compartment, the latter marks being located at levels for indicating a plurality of predetermined volume relationships between the contents of the respective compartments.

If, for example, it is desired to add to any quantity of gasoline within the main compartment a definite proportional quantity of lubricating oil, the number indicating the gasoline level is observed, the appropriate ratio column on the smaller compartment selected, and oil placed in the smaller compartment to the level of the number corresponding to the observed gasoline numbered level.

Following the proportionality adjustment of the liquids, a closure is placed over the filling opening to the smaller compartment, and the graduate tilted back and forth to mix the contained liquids. The mixture is then a properly adjusted oil-gasoline blend for use in the operation of a two-cycle engine.

DESCRIPTION OF THE PREFERRED EMBODIMENT

Figure 1:
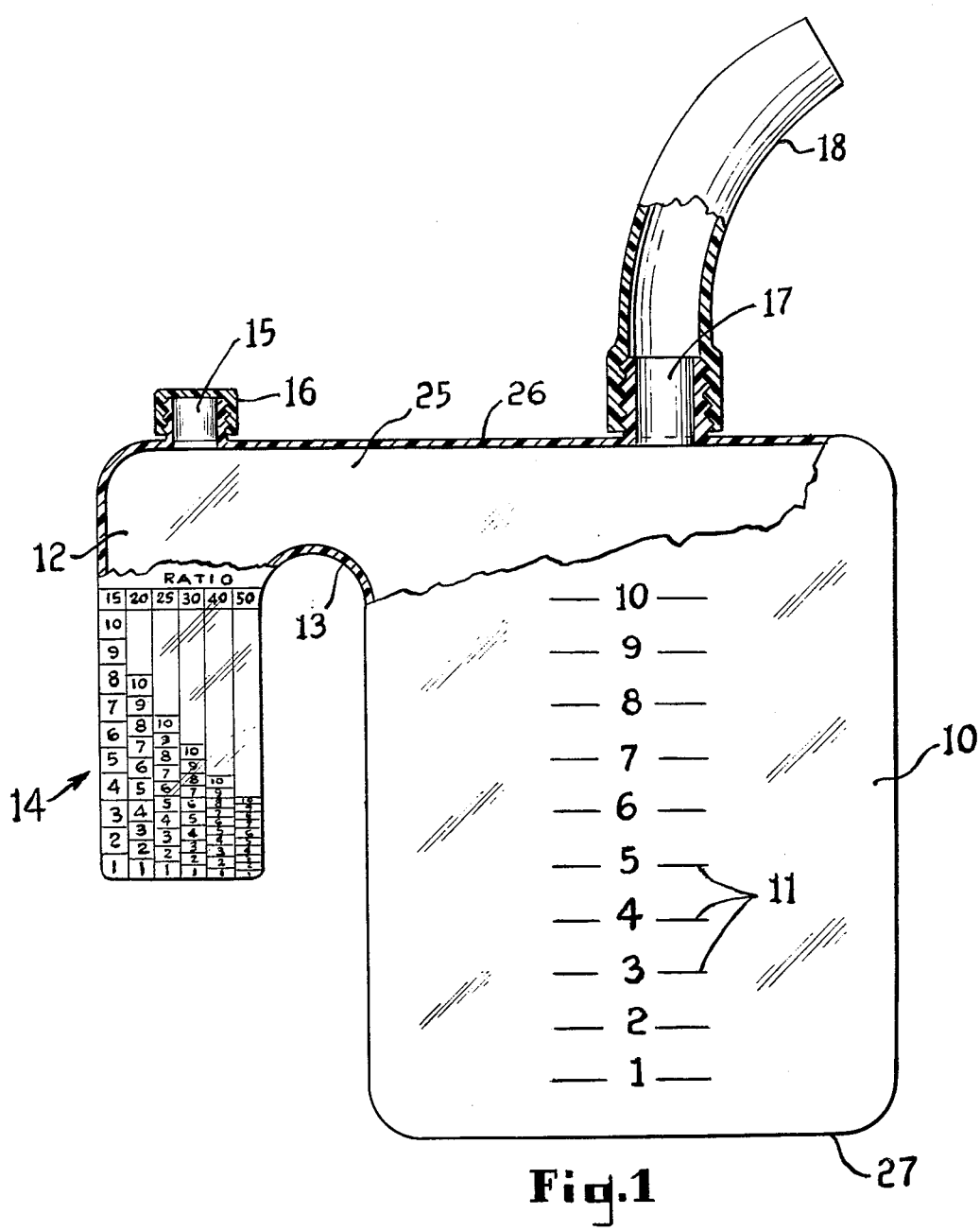
FIG. 1 is a side elevation of the graduate, shown partly in section.
Figure 2:
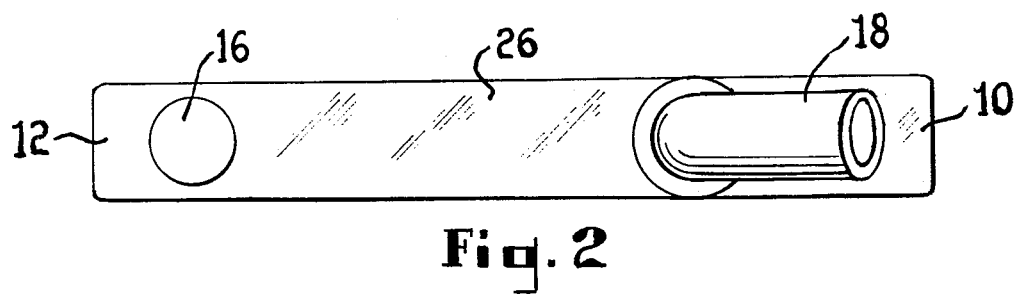
FIG. 2 is a plan view of the invention.
Figure 3:
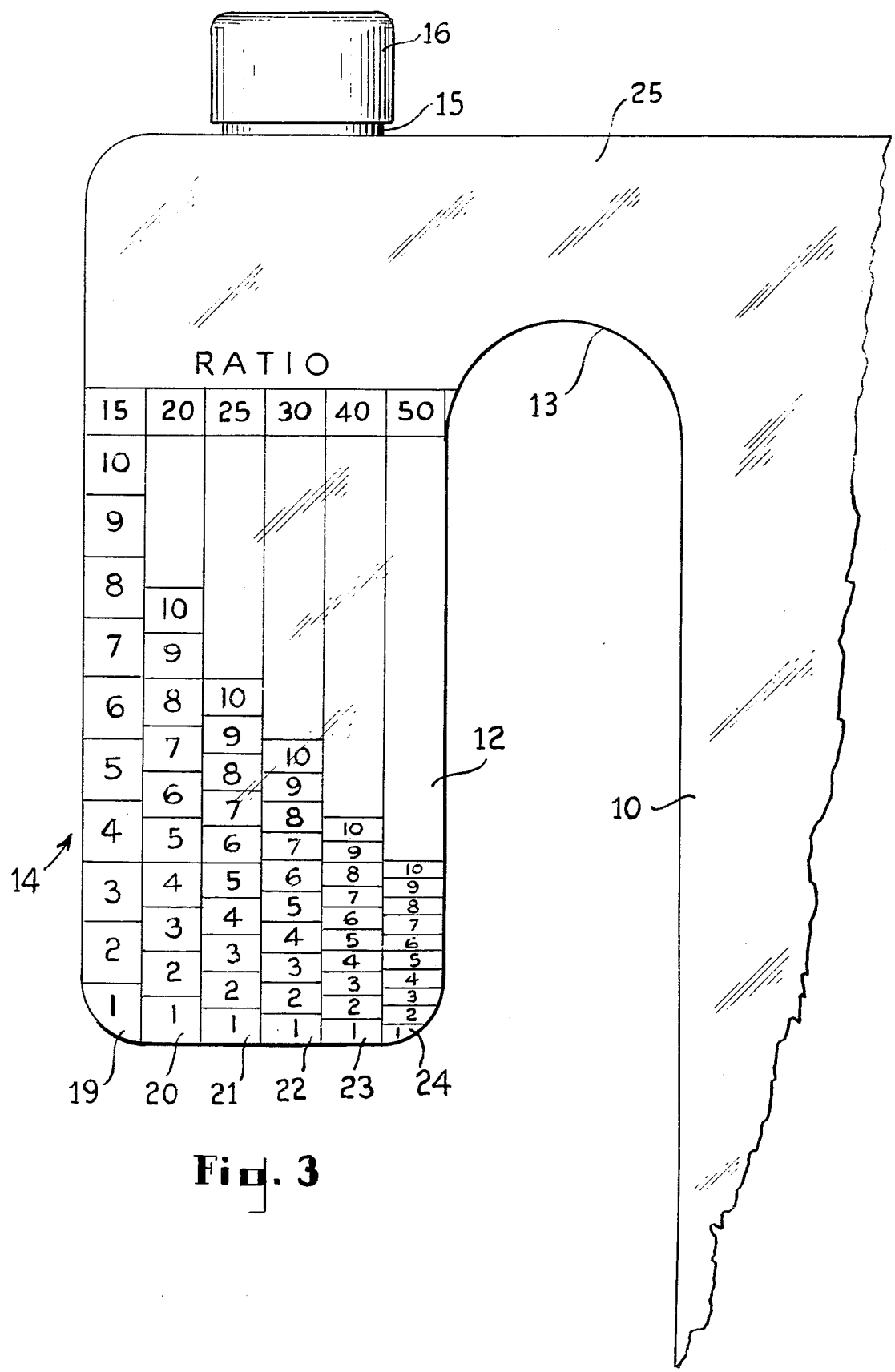
FIG. 3 is a fragmentary side elevational view, somewhat enlarged to more clearly depict the ratio array graduations on the smaller compartment.

As illustrated at FIGS. 1 and 2, the graduate is an elongate container of rectangular shape in plan, housing a liquid-receiving main compartment 10 in communication with a much smaller liquid-receiving compartment 12 via the superadjacent mixing compartment 25, the latter including the restricted coextensive neck portion 13. The flat top 26 extends longitudinally over all three compartments and functions as the upper bounding surface of the interconnecting horizontally extending mixing compartment.

The geometry of the graduate is such that; when empty, it assumes a stable upright posture when resting on the flat underside 27 of the main compartment 10, the undersides of the respective liquid-receiving compartments lying in vertically spaced parallel planes, the smaller compartment being cantilevered and supported from the main compartment.

A opening 15 defined by an integral upstanding cylindrical wall is disposed vertically above the smaller compartment 12, so located that liquid entering the smaller compartment is precluded from entering the main compartment; a similar opening 17 is disposed vertically above the main compartment 10, so located that liquid passing through the opening is precluded from entering the smaller compartment.

A single row of spaced graduation marks 11, numbered 1 through 10, extend upwardly along one side of the main compartment 10 to an elevation below the underside of the neck portion 13, and a ratio array of a plurality of discrete graduated columns 14 extend upwardly along a coplanar side of the smaller compartment 12, the graduation marks along each column being also numbered 1 through 10. The volume relationship between the compartments is predetermined such that a specific ratio of the main compartment content to the smaller compartment content is shown by the ratio-designating indicia at the upper end of each column of the array when the number at the level of the liquid in the main compartment corresponds to a like number at the level of the liquid in any column of the ratio array.

To illustrate the use of the graduate, assume that the upper surface of a quantity of gasoline in the main compartment is at the level number 5, and that a mixture of one part oil in fifteen parts of gasoline is desired. Oil is added to the smaller compartment until the surface of the oil appears at the level numbered 5 in column 19 of the array, this column having a ratio designation number of 15. The opening 15 is then tightly closed by the fitted cap 16, the graduate bodily lifted and tilted back and forth to thoroughly mix the liquids, after which the modified fuel may be poured out through the spout 18, which tightly fits over the main compartment opening 17.

The herein described graduate is a proportioning and mixing container based on volume relationships, the ratio array 14 illustrating in the columns 19, 20, 21, 22, 23 and 24 a range of six gasoline to oil ratios generally suitable for all two-cycle engines. The desired mixing ratios are quickly assured without requiring any measurements in absolute terms.

Any random quantity may be poured into the main compartment, the surface level thereof observed, the desired ratio selected and additive poured into the smaller compartment to the level of a like number in the ratio column chosen. Only manipulation of the liquids through the mixing compartment is then necessary to effect the proper fuel blend.

What is claimed is:

1. A three compartment proportioning and mixing graduate of transparent material having an elongate top and a flat bottom, said graduate comprising
   a horizontally extending mixing compartment subjacently and coextensively underlying said top,
   a main liquid-receiving compartment and a spatially separated smaller liquid-receiving compartment each in communication with and extending downwardly from the ends of said mixing compartment,
   a horizontally extending neck interposed between said liquid-receiving compartments and bridging the space therebetween,
   said neck defining a restricted portion of said mixing compartment bounded along the upper surface by said top and along the lower surface by said neck,
   longitudinally spaced openings in said top, one above said main compartment and the other above said smaller compartment,
   a single row of vertically spaced graduate marks and associated indicia disposed along said main compartment for visibly indicating the level of the surface of a liquid therein, and
   an array of ratio-designated rows of vertically spaced graduate marks and associated indicia disposed on an upstanding side of said smaller compartment, the marks in said array being positioned to selectively indicate predetermined volume relationships of the liquid contained within the respective liquid-receiving compartments.

2. The graduate as defined in claim 1, wherein the upstanding array-bearing side of the smaller compartment is coplanar with the indicia-bearing side of the main compartment.

3. The graduate as claimed in claim 1, wherein the top of the graduate and the underside of the main compartment lie in vertically spaced parallel planes.

4. The graduate as set forth in claim 1, in which the graduate marks disposed on said main compartment are spaced to designate ten differing liquid levels numbered 1 through 10, and said array of indicia and associated graduate marks disposed on said smaller compartment includes at least six parallel ratio-designated upstanding rows of graduate marks, the graduate marks of each row being numbered 1 through 10, the volume of a liquid within the smaller compartment as indicated by any graduate mark thereon being related to the volume within the main compartment indicated by a like numbered graduate mark thereon by the ratio designation of the particular row observed.

5. The graduate as claimed in claim 4, in which adjacent graduate marks on the main compartment designate identical volumes therein.

6. The graduate according to claim 1, wherein said smaller compartment is cantilevered from the outer end of said neck and depends therefrom to an intermediate elevation between that of the upper end of the main compartment and the underside thereof.

7. The graduate as claimed in claim 6, in which the opening providing access to the smaller compartment is fitted with a removable closure and a coextensive pouring spout is joined with the perimeter of the opening leading to the main compartment.

8. The graduate as defined in claim 6, wherein graduate marks and associated indicia are integrally embossed portions of the wall structure of the graduate.

* * * * *